United States Patent [19]
Sumner

[11] Patent Number: 6,092,437
[45] Date of Patent: Jul. 25, 2000

[54] WINCH BAR

[76] Inventor: David E. Sumner, 3825 State Rd. 60 W., Mulberry, Fla. 33860

[21] Appl. No.: 09/132,544

[22] Filed: Aug. 11, 1998

[51] Int. Cl.⁷ .................................. G05G 1/12; B25G 3/02
[52] U.S. Cl. .............................. 74/544; 74/543; 16/114 R
[58] Field of Search ........................... 74/544, 543, 545, 74/546; 16/114 R; 81/177.2, 177.1; D8/10

[56] References Cited

U.S. PATENT DOCUMENTS

| | | | |
|---|---|---|---|
| 280,667 | 7/1883 | P'Pool | 16/114 R |
| D. 314,318 | 2/1991 | Uimonen | D8/10 |
| 664,217 | 12/1900 | Jencke et al. | 74/544 X |
| 3,119,278 | 1/1964 | Simpson | 74/544 X |
| 3,843,981 | 10/1974 | Verest | 74/544 X |
| 4,607,974 | 8/1986 | Brothers et al. | |
| 4,784,369 | 11/1988 | Bock . | |
| 4,873,742 | 10/1989 | Dillon . | |
| 5,301,389 | 4/1994 | Engel et al. | |
| 5,425,154 | 6/1995 | Edwards, Jr. | |
| 5,433,127 | 7/1995 | Messier . | |
| 5,433,565 | 7/1995 | Chan . | |
| 5,791,006 | 8/1998 | Anctil | 16/114 R X |

*Primary Examiner*—Mary Ann Battista
*Attorney, Agent, or Firm*—Bergert & Bergert

[57] ABSTRACT

A winch bar is adapted at each end for use with ratcheting winches on truck trailer beds to respectively wind and tighten tie straps for securing cargo on the truck bed. The winch bar is provided with a hooked end member and a handle portion at one end to assist in the rapid winding of a strap secured to the ratcheting winch member. At the other end, the winch bar is provided with an angled end member which may be tapered so as to securely engage the winch member for tightening the strap. The handle portion may be used to provide leverage when tightening the strap.

9 Claims, 3 Drawing Sheets

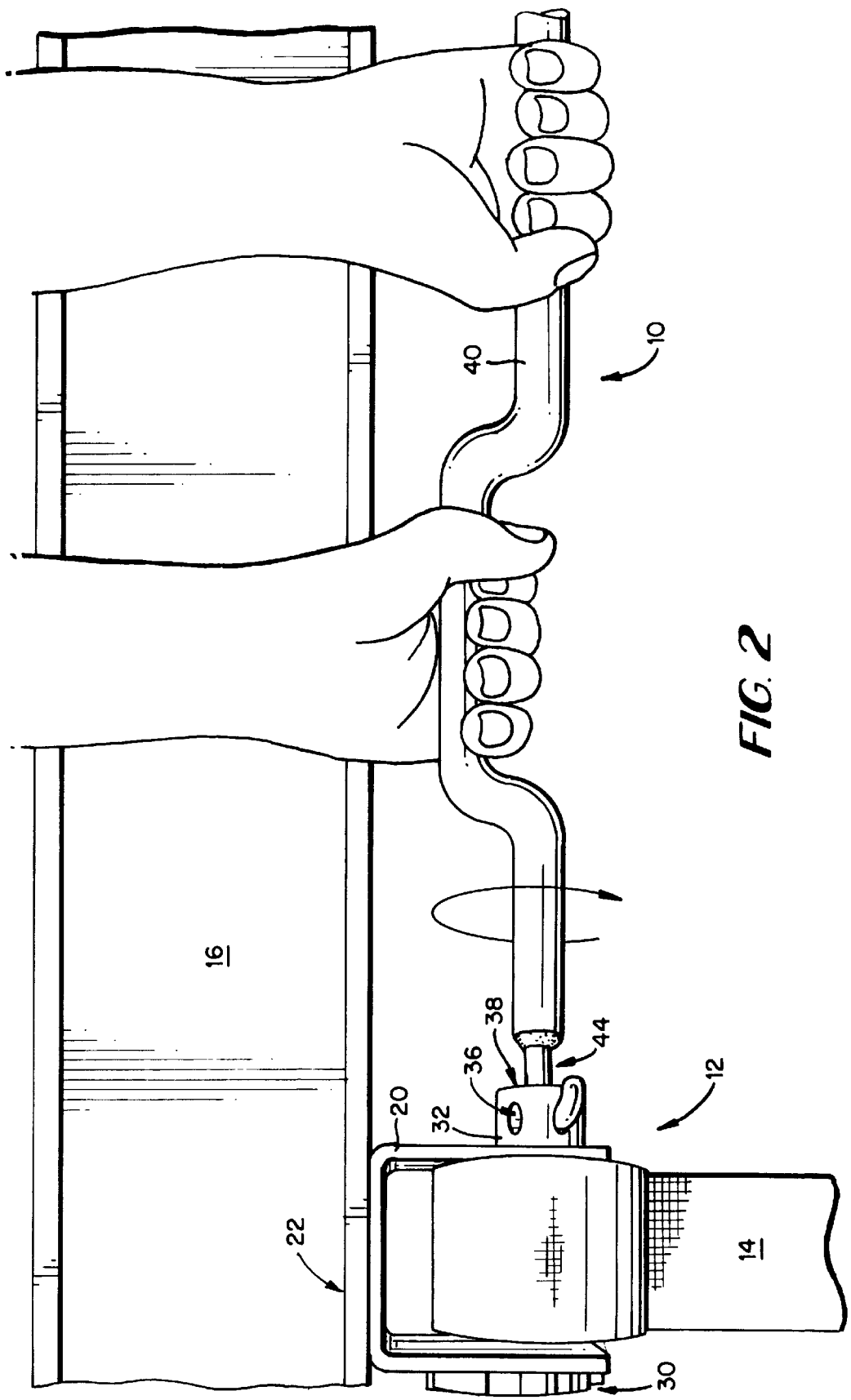

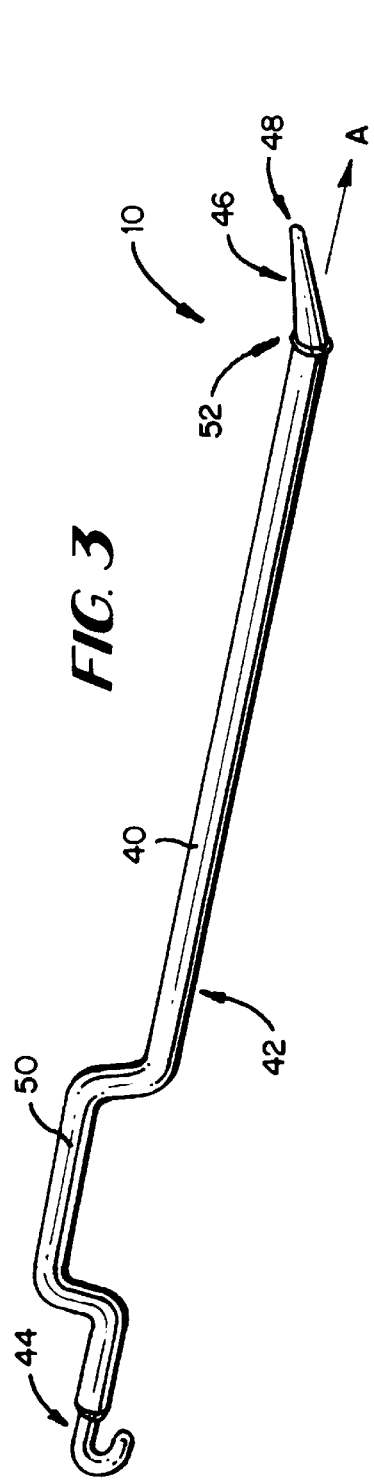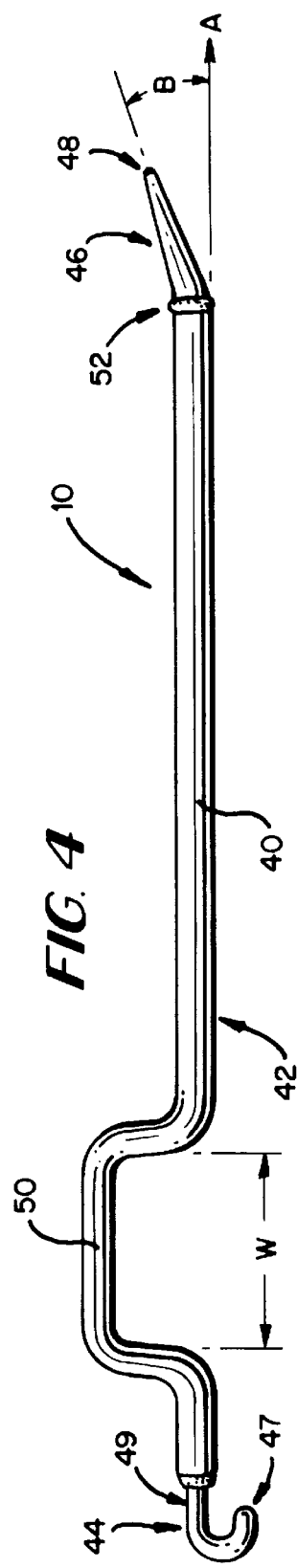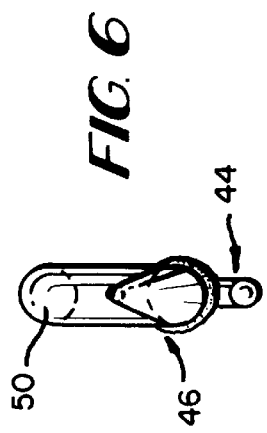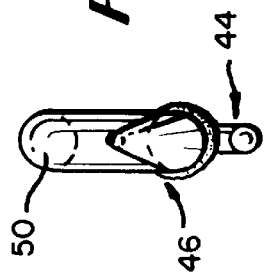

WINCH BAR

BACKGROUND AND SUMMARY OF THE INVENTION

This invention relates to winch bars and more particularly to a winch bar adapted for use with ratchet binders in winding and tightening straps for securing loads on flat bed trailers.

Tie down straps are conventionally used for securing cargoes on flat bed truck trailers and the like. Each strap has two ends, with a first end being securable to one side of the trailer, using an anchor ring or the like secured to the truck deck. The second end of the strap is connected to a ratchet binder or ratcheting winch which is tightened to secure each strap over the load. Each winch conventionally includes a ratchet mechanism and a winding drum. The second end of each strap is thus fitted into a slot on the winding drum so that the strap may be wound up or tightened as desired. As the strap is tightened, it is held in position by the ratchet mechanism. Conventionally, the tightening of tie down straps has been accomplished using hollow pipes or similar articles while the winding of the tie down straps has been performed manually. These methods have been proven time consuming and unreliable for quick and efficient winding and tightening of tie straps.

Previous devices related to winch bars and other similar tools are described, for example, in the following U.S. Pat. Nos.: 4,607,974 to Brothers et al.; 4,784,369 to Bock; 4,873,742 to Dillon; 5,301,389 to Engel et al.; 5,425,154 to Edwards, Jr.; 5,433,565 to Chan; and 5,433,127 to Messier. None of these devices shows a winch bar adapted at one end for rapidly winding a truck bed strap and adapted at the other end for tightening a truck bed strap once it has been secured over a cargo load in accordance with the features of the present invention.

It is thus one object of the present invention to provide an improved winch bar which may be used to quickly wind tie down straps on conventional ratcheting winches as well as to tighten the straps over a given load.

It is also an object of the invention to provide an improved winch bar having two ends adapted to securely engage a conventional ratcheting winch and further having a handle to assist in winding as well as tightening tie down straps secured to the winch.

By the present invention, there is provided a winch bar having one end adapted for use in winding a strap secured to a winch on a truck bed trailer, for example, and a second end adapted for use in tightening the strap. The first end extends from a central portion of the winch bar and has a generally hooked shape for engaging portions of the winch for winding. The second end extends at an angle to the central portion for engaging portions of the winch for tightening. The winch bar central portion is also provided with a handle member to assist in the winding and tightening of the straps.

BRIEF DESCRIPTION OF THE DRAWINGS

FIG. 2 is a front elevational view of the winch bar of the present invention, shown inserted in a truck bed winch for winding the strap shown therein.

FIG. 3 is a perspective view of the winch bar of the present invention.

FIG. 4 is a front elevational view of the winch bar of the present invention.

FIG. 5 is a left end view of the winch bar of the present invention.

FIG. 6 is a right end view of the winch bar of the present invention.

DETAILED DESCRIPTION OF THE PREFERRED EMBODIMENTS

Figure 1:
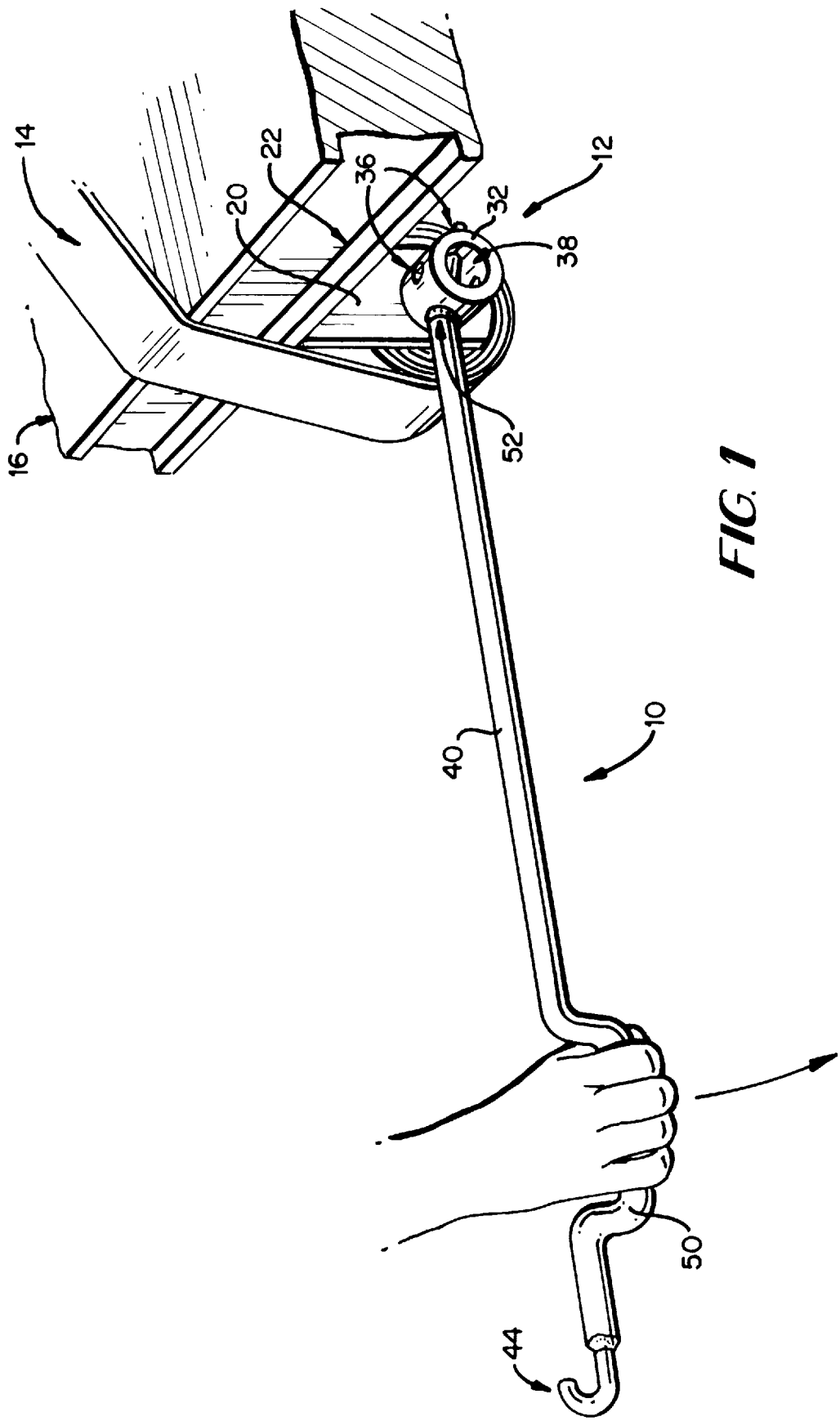
FIG. 1 is a perspective view of the winch bar of the present invention, shown secured in a truck bed winch so as to tighten the strap held within the winch.

In the embodiment of the invention as shown in FIGS. 1 through 6, there is provided a winch bar 10 for operating a ratcheting winch member 12 such as those used in connection with tie down straps 14 for securing cargoes on flat bed truck trailers 16, for example. The tie down strap 14 may be of nylon, as shown in FIGS. 1 and 2, or alternatively may be a flexible, tension member such as a chain or cable. Typically, the tie down strap will be secured at one end to one side of the trailer using an anchor ring or the like secured to the truck deck. The other end of the tie down strap is receivable by the winch member 12 which is used to wind the strap for tightening over the cargo load.

As shown in FIGS. 1 and 2, the winch member 12 includes an inverted U-shaped bracket 20 wherein the top of the bracket is connected to the truck frame 22 on one side of the trailer. The bracket is adapted to receive the strap 14 for rotation about a drum secured within the bracket. A conventional ratchet mechanism 30 is provided outside the bracket at one end of the drum to prevent the drum from releasing the strap as it is tightened until the ratchet is manually released. At the end opposite the ratchet mechanism 30, an annular member 32 is secured to the drum. The winch member 12 is configured such that rotation of the annular member 32 will rotate the drum and thereby wind the strap 14 secured thereto. The annular member 32 is provided with a plurality of pairs of diametrically opposed winch bar receiving apertures 36 extending therethrough. While FIG. 1 shows a winch member having two pairs of diametrically opposed apertures in the annular member, the exact number of pairs of apertures is not critical. The drum also has a central opening 38 located within the annular member 32.

As shown in FIGS. 1 through 6, the winch bar 10 includes an elongated bar member 40 of circular cross-section which may be made of metal, for example, and which has a central portion 42 and two end members 44, 46. The first and second end members may be formed integrally with the central portion or may be welded to the central portion such as by a circle weld, for example. The central portion extends along an axis A and, in one embodiment of the invention, the central portion is rounded with a diameter of approximately ⅞ inches. The first end member 44 extends axially from the central portion and is bent back upon itself so as to be in the general shape of a hook. In one embodiment of the invention, the first end member is rounded with a diameter of approximately ½ inch and is bent back 180 degrees with a distance between the hook tip 47 and the hook base 49 of approximately ¼ inch. As shown in FIG. 2, the first end member 44 may be inserted through the winch member central opening 38 and one of the annular wall apertures 36 whereupon the bar 40 may be manually rotated so as to wind up the strap member 14.

As shown in FIG. 4, the second end member 46 extends at an angle B from the central portion axis. In one embodiment of the invention, angle B ranges from approximately 10 degrees to approximately 30 degrees. In a specific embodiment of the invention, angle B is approximately 15 degrees. Second end member 46 is also tapered from a maximum diameter at the central portion to a minimum diameter at the end tip 48. Such an arrangement allows the second end member to be easily inserted through the winch member apertures 36. In one embodiment of the invention, the second end member maximum diameter is approximately ⅞ inches and the minimum diameter is approximately ½ inch. As shown in FIG. 1, the second end member 46 is of sufficient length so as to extend fully through a pair of opposing winch member apertures 36. This allows the bar to securely engage the winch member and thereby provide optimal leverage for the manual tightening of the tie down strap across the cargo on the truck bed 16. In one embodiment of the invention, the second end member is from approximately 2½ to approximately 3 inches in length. Top weld #52 is provided at beginning of tapered end to act as a stop to prevent $2^{nd}$ end member 46 from going too deep.

As shown in FIGS. 1 through 4, the central portion 42 is provided with a handle portion 50 positioned proximal to the first end member 44. In one embodiment of the invention, the handle portion is positioned from approximately two to approximately three inches from said first end member. The positioning of the handle portion 50 provides the user with a leveraging grip when the second end member is secured to the winch member for tightening the strap, as shown in FIG. 1, and a controlling grip when the first end member is secured to the winch member for rapidly winding the strap, as shown in FIG. 2. The handle portion may be provided with a generally C-shaped cross section as shown in FIGS. 1 through 4, and is sufficiently sized so as to allow any sized hand to operate the bar. In one embodiment of the invention, handle portion has an inner width W of approximately 4½ inches. As shown in FIG. 4, the handle portion extends outwardly from the central portion axis A approximately 180 degrees from the direction in which the first end member 44 bends away from the axis to promote ease of securing the first end member within the apertures on the winch. Also, the handle portion 50 extends outwardly from the central portion axis in approximately the same direction as the second end member to promote ease of applying tightening leverage to the winch when the second end member is secured therein.

In operation of the winch bar of the present invention to rapidly wind a tie strap for a truck bed, as shown in FIG. 2, for example, the first end member 44 is inserted through the central opening 38 and one of the apertures 36. The user then imparts a winding motion to the handle which rapidly turns the annular wall and thus winds the tie strap 14 secured within the winch 12. Winding the strap quickly is advantageous in taking up any slack in the strap prior to tightening the strap across the cargo load as well as in winding the strap out of the way when not in use. The location of the handle portion proximal to the first end member 44 thus provides controlled and rapid winding ability to the user. The first end member 44 is sufficiently sized to easily fit within the winch member central opening 38 and the annular wall apertures 36. In one embodiment, the first end member has a diameter of approximately ½ inch.

In operation of the winch bar to tighten a tie strap across a cargo load as shown in FIG. 1, for example, the second end member 46 is placed within opposing winch apertures 36 so as to securely engage the annular wall. The user then exerts force on the handle portion to crank the winch as securely as desired so as to tighten the tie strap 14 across the given load. The winch bar is of sufficient length to provide the amount of torque necessary to sufficiently tighten the winch member. In one embodiment of the invention, the length of the winch bar is from approximately 30 inches to approximately 36 inches. The tapered diameter of the second end member eases the insertion of the second end member into the apertures 36. Additionally, the round tapered second end member may be easily rotated within the apertures so as to allow the bar to be rotated for further tightening without initially having to be removed from the apertures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device which winds a winch having a winding drum with an annular wall, a central opening, and a plurality of apertures extending diametrically through the annular wall, the device comprising:

a bar having a central portion, said central portion having an axis, said bar further having means at a first end for engaging said central opening and at least one of said apertures so as to allow rapid winding of said winch, said bar also having means at a second end for engaging a pair of said apertures so as to allow leveraged winding of said winch.

2. The device of claim 1 wherein said first end means includes an end member which extends coaxially from said central portion and which is bent back upon itself so as to form a generally hooked shape.

3. The device of claim 1 wherein said second end means includes a tapered end member extending at an angle to the central portion axis.

4. The device of claim 3 wherein said angle ranges from approximately 10 degrees to approximately 30 degrees.

5. The device of claim 1 wherein said central portion has a handle portion.

6. The device of claim 5 wherein said handle portion is positioned proximal to said first end means.

7. The device of claim 5 wherein said handle portion is generally C-shaped in cross-section.

8. The device of claim 1 wherein said first end means includes an end member which extends coaxially from said central portion and which is bent back upon itself so as to form a generally hooked shape and wherein said second end means includes a tapered end member extending at an angle to the bar axis.

9. The device of claim 8 wherein said central portion includes a handle portion.

* * * * *